(12) United States Patent
Arnaud et al.

(10) Patent No.: US 9,886,497 B2
(45) Date of Patent: Feb. 6, 2018

(54) INDEXING PRESENTATION SLIDES

(71) Applicants: Charles Arnaud, Villeneuve Loubet (FR); Dominique Picard, Saint Jeannet (FR)

(72) Inventors: Charles Arnaud, Villeneuve Loubet (FR); Dominique Picard, Saint Jeannet (FR)

(73) Assignee: International Business Machines Corporation, Armonk, NY (US)

( * ) Notice: Subject to any disclaimer, the term of this patent is extended or adjusted under 35 U.S.C. 154(b) by 459 days.

(21) Appl. No.: 14/556,738

(22) Filed: Dec. 1, 2014

(65) Prior Publication Data

US 2015/0161183 A1   Jun. 11, 2015

(30) Foreign Application Priority Data

Dec. 6, 2013 (GB) .................................. 13215876

(51) Int. Cl.
*G06F 17/30* (2006.01)

(52) U.S. Cl.
CPC .. *G06F 17/30616* (2013.01); *G06F 17/30312* (2013.01)

(58) Field of Classification Search
CPC ......... G06F 17/30312; G06F 17/30035; G06F 17/2785; G06F 17/30029; G06F 17/211; G06F 17/30616; G06F 17/30613; G06F 3/0481; G06F 3/01; G06F 3/0482; G06F 3/048; G06F 3/043; Y10S 707/99952; G09G 5/10; H04L 67/38; G06L 67/1813
See application file for complete search history.

(56) References Cited

U.S. PATENT DOCUMENTS

| | | | | |
|---|---|---|---|---|
| 6,021,412 | A * | 2/2000 | Ho | G06F 17/24 707/E17.009 |
| 6,636,238 | B1 * | 10/2003 | Amir | G06F 17/3074 707/E17.101 |
| 7,493,561 | B2 * | 2/2009 | Sareen | G06F 17/30056 715/200 |
| 8,041,718 | B2 | 10/2011 | Takagi et al. | |
| 8,341,528 | B2 | 12/2012 | Chaudhary et al. | |
| 2006/0294046 | A1 * | 12/2006 | Sareen | G06F 17/241 707/E17.004 |
| 2006/0294468 | A1 * | 12/2006 | Sareen | G06F 17/30056 715/730 |
| 2006/0294469 | A1 * | 12/2006 | Sareen | G06F 17/30038 715/730 |
| 2007/0112764 | A1 * | 5/2007 | Yih | G06F 17/241 707/E17.084 |
| 2008/0263010 | A1 * | 10/2008 | Roychoudhuri | G06F 17/30056 707/E17.009 |

(Continued)

FOREIGN PATENT DOCUMENTS

EP   1973046 A1   9/2008

*Primary Examiner* — Anh Ly
(74) *Attorney, Agent, or Firm* — Brown & Michaels, PC; Julius Kraft (57) ABSTRACT

A method of indexing individual slides of a presentation comprises selecting a slide of a presentation, determining one or more words in the selected slide, counting the number of occurrences of each determined word in the selected slide and storing an identifier for the selected slide, the identifier comprising a set of pairs of the determined words and counted occurrences of the respective word.

9 Claims, 9 Drawing Sheets

(56) References Cited

U.S. PATENT DOCUMENTS

| | | |
|---|---|---|
| 2013/0144874 A1 | 6/2013 | Koperda et al. |
| 2014/0096006 A1* | 4/2014 | Berglund ................ G06T 13/80 715/732 |
| 2015/0220505 A1* | 8/2015 | Weir ................... H04L 12/1827 715/730 |
| 2016/0019474 A1* | 1/2016 | Cheng ............... G06F 17/30616 705/5 |

* cited by examiner

Fig. 3b $$D1 = \sqrt{\sum_{k=1}^{p} |e_{ki} - e_{kj}|2}$$

$$D2 = \sqrt{\sum_{k=1}^{p} |n_{ki} - n_{kj}|2}$$

INDEXING PRESENTATION SLIDES

FIELD OF THE INVENTION

This invention relates to a method of indexing individual slides of a presentation and to a system for performing the indexing.

BACKGROUND

In the modern business environment, employees often use presentation and slide software applications such as Microsoft PowerPoint, Lotus Symphony Presentations or Open Office Presentation, in order to build presentations that are used as a visual support for presenting a subject to an audience. Presentations are composed of slides and each slide has very specific characteristics, in that a slide is a semantic subset of the global message that can be considered as relatively coherent and autonomous and the meaning of a slide is, in most cases, contained in words and the number of words used in a slide is small and limited owing to the visibility constraint.

When such software is used within large organizations, huge numbers of presentations are continuously produced and stored by different individuals in different places. In such organizations it is very difficult for a user to find existing presentations linked to a specific subject and they can only be found if the user knows where they are stored, the meaning of each presentation is included in the name of the presentation, the directory structure and/or some metadata is available and the user has access to the right search tool to crawl through the whole set of presentations. In most cases it is very time consuming or impossible for a user to find a specific slide linked to a subject without actually opening each presentation in turn.

When building a new presentation, a user will often want to reuse slides extracted from other pre-existing presentations and modify them (or not) in order to fit to the proper purpose of the new presentation. In order to find the right raw material, the user is faced with the problems described above and will often spend a lot of time finding presentations that relate to the same subject or to a connected subject and then finding the right slide after having opened the presentation for a new presentation.

Some usable search tools do exist, such as Google Desktop search, which can help a user in relation to a local search but the atomicity will be at the presentation level and not the slide level. Search tools are also provided that are linked to a user's operating system, but there is no solution or tool for a slide level search and for a global search beyond disks identified on the user's local computer. All searches look for a formula that is true across the whole presentation and not only within an individual slide.

BRIEF SUMMARY OF THE INVENTION

According to a first aspect of the present invention, there is provided a method of indexing individual slides of a presentation comprising selecting a slide of a presentation, determining one or more words in the selected slide, counting the number of occurrences of each determined word in the selected slide and storing an identifier for the selected slide, the identifier comprising a set of pairs of the determined words and counted occurrences of the respective word.

According to a second aspect of the present invention, there is provided a system comprising a processor arranged to select a slide of a presentation, determine one or more words in the selected slide, count the number of occurrences of each determined word in the selected slide and store an identifier for the selected slide, the identifier comprising a set of pairs of the determined words and counted occurrences of the respective word.

According to a third aspect of the present invention, there is provided a computer program product on a computer readable medium for indexing individual slides of a presentation, the product comprising instructions for selecting a slide of a presentation, determining one or more words in the selected slide, counting the number of occurrences of each determined word in the selected slide and storing an identifier for the selected slide, the identifier comprising a set of pairs of the determined words and counted occurrences of the respective word.

Owing to the invention, it is possible to provide a simple methodology for indexing individual slides of a presentation that will subsequently allow users to define queries that can be used to search for individual slides and provide meaningful results. The core idea is to provide a simple identifier for each slide that uses the words present in the slide and the number or instances for each word. This identifier will not be an unique identifier, but will represent a summary of the slide and will be closely linked to the meaning of the slide. This can be used to define a Euclidian distance using the lists of words and the number of occurrences to calculate if two slides are the same, close or distant. The advantages of using this solution includes the enabling of rapidly finding slides linked to a set of words, finding slides with close meanings without using semantic tools, finding presentations containing similar slides (that have close meanings) as potential raw material for connected subjects and finding different variations of the same slide with the Euclidean distance indicating how similar the two slides are to each other.

The method preferably further comprises repeating the steps of selecting a slide of the presentation, determining one or more words in the selected slide, counting the number of occurrences of each determined word in the selected slide and storing an identifier for the selected slide, the identifier comprising a set of pairs of the determined words and counted occurrences of the respective word for every slide in the presentation. In this way, every presentation that is to be processed will have each and every slide within the presentation indexed automatically. This can occur whenever a presentation is saved, for example, taking place in the background with the creator of a new presentation being unaware that each slide of their newly saved presentation has been indexed. This creates a database of identifiers that are linked to specific slides in saved presentations.

Advantageously, the method further comprises receiving a query comprising a slide, determining one or more words in the query slide, counting the number of occurrences of each determined word in the query slide, generating an identifier for the query slide, the identifier comprising a set of pairs of the determined words and counted occurrences of the respective word and determining an indexed slide with the closest identifier to the identifier of the query slide. When a user first starts to work on a new presentation, they can create the first slide and then use this slide as the basis of a search of existing slides in order to find existing slides and presentations that are relevant to the new presentation that is being created. An identifier is created for this "query slide" and this identifier is then compared to the saved identifiers in the database to find the closest matching identifier (a slide for that identifier).

Alternatively, the method further comprises receiving a query comprising a set of keywords and determining an indexed slide with the closest identifier to the set of keywords. In addition to using a query that is itself a presentation slide, a query could be provided that simply comprises a list of keywords. This list of keywords could be used as the basis for a search of the identifiers stored in the database and to find the closest matching slide.

Ideally, the method further comprises generating an ordered list of indexed slides with the closest identifier to the identifier of the query slide or set of keywords. Instead of returning a single closest slide to the query filed (whether a slide or a list of keywords), the method can be configured to provide an ordered list of slides that shows the user the slides that have been found with the closest identifiers to the query. This could be a list of a specific number of slides, such as the ten closest slides, or it could be a list of slides that match below a predetermined threshold (if Euclidean distance is being used as a measure of similarity).

BRIEF DESCRIPTION OF THE DRAWINGS

Preferred embodiments of the present invention will now be described, by way of example only, with reference to the following drawings, in which.

DETAILED DESCRIPTION OF THE DRAWINGS

Figure 1:
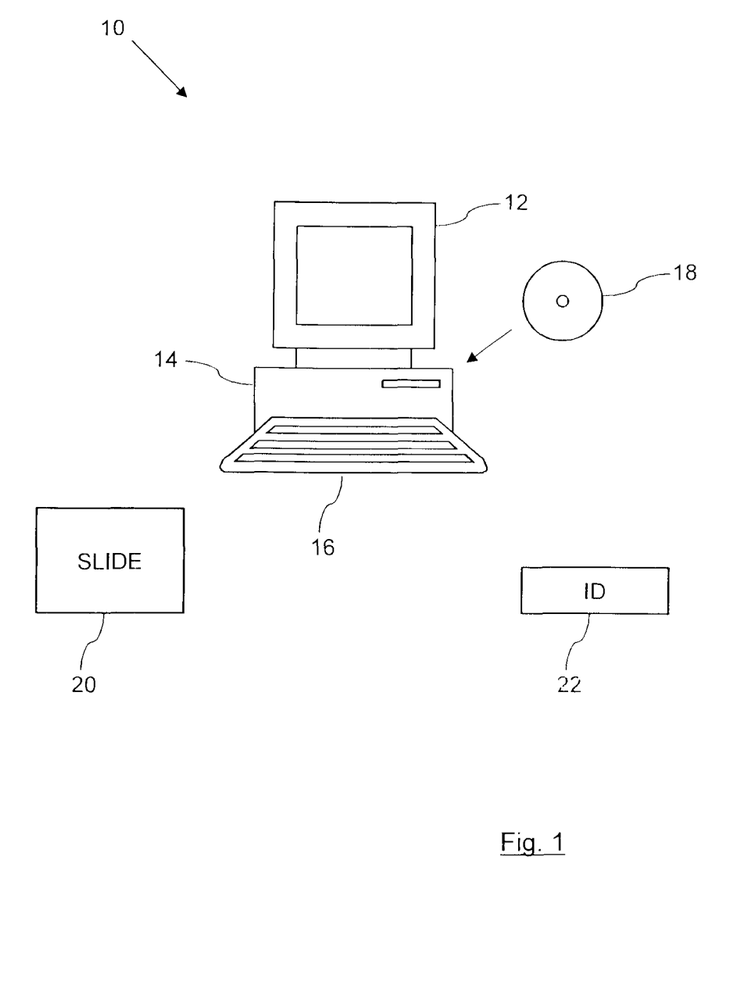
FIG. 1 is a schematic diagram of a system for indexing a slide.

FIG. 1 shows a desktop computer 10 that comprises a display device 12, a processor 14 and a user interface device 16 (a keyboard). The processor 14 is controlled by a computer program product that is stored on a computer readable medium 18 (CD-ROM 18). The computer program product comprises instructions that arc used to control the operation of the processor 14. The processor 14 is arranged to process a slide 20 and output an identifier 22. The slide 20 will form part of a presentation comprising multiple slides 20, but the indexing performed by the processor 14 is carried out at the granularity of slide level.

The slide index structure and construction method generates an identifier 22 for a specific slide 20, which is not necessarily unique to the slide 20 (two different slides 20 could have the same identifier 22). The index method will use the number of words identified in the text part of the slide 20 without taking into account any of the edition characteristics, such as font, color, lower/upper case or size. Any consecutive sequence of alphabetical characters in a slide 20 will count as a word. Each nonalphabetical character will end a sequence. Thus, it is possible to build a set of couples (word, number of instances of the word) linked to the slide 20.

The processor 14 could choose to order the words in alphabetical order, in order to accelerate subsequent treatments. For a presentation P composed of n slides, it could be considered that if the slide number i: $S_i$ is composed of m different words, the identifier 1 is:

$$I_i = ((W_{i1}, N_{i1}), (W_{i2}, N_{i2}), (W_{i3}, N_{i3}), (W_{i4}, N_{i4}), \ldots (W_{im}, N_{im}))$$

This means that each slide 20 is reduced to a list of words determined as being present in the slide 20 with a respective integer equal to the number of occurrences of each determined word in the specific slide 20. This identifier 22 can be stored in a database of such identifiers 22 with a link to the specific slide 20 for that identifier 22.

Figure 2:
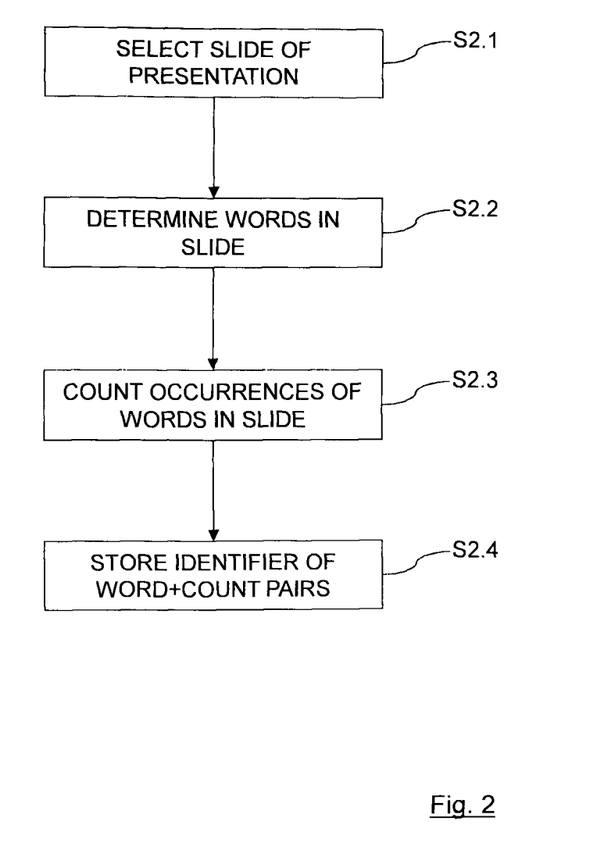
FIG. 2 is a flowchart of a method of indexing a slide.

The method of indexing individual slides of a presentation is summarized in FIG. 2 that shows a flowchart of the method steps executed by the processor 14 when performing the indexing of a slide. The method comprises the steps of, firstly step S2.1, which comprises selecting a slide 20 of a presentation. If the processor 14 is presented with a new presentation, it will process all of the slides 20 of the presentation in order. The second step of the method, step S2.2, comprises determining one or more words in the selected slide 20. As discussed above, this will ignore all formatting of the words within the slide 20. Preferably, all of the words in the slide 20 will be identified and used, but only a subset could be used.

The next step of the method is step S2.3 that comprises counting the number of occurrences of each determined word in the selected slide 20. The processor 14 simply counts the number of times that each word is found in the slide 20. This can include using a protocol that conflates similar words, so plurals may be ignored and known alternatives such as the use of acronyms may be conflated into a single count for the same word. The final step of the method, step S2.4, comprises storing an identifier for the selected slide 20, the identifier comprising a set of pairs of the determined words and counted occurrences of the respective word.

In this way, the processor 14 will generate an identifier 22 for a specific slide 20. All of the slides 20 within the presentation will be processed according to this methodology. The identifiers 22 so generated can be stored in a database that could be locally situated on the machine 10, but will more likely he located remotely on a network connected server that is accessible to other users. In a large organization, all existing presentations can he processed in this manner and the identifiers 22 generated can be centrally stored so that all users within the organization that have access to a computer can access the database of identifiers 22.

Once a database has been populated with identifiers 22, then that database can be searched by a user who wishes to find useful slides. In general, a user will either be starting from scratch and have no slides at all in their new presentation or they will have generated one or more slides already and need assistance in adding further slides to their new presentation. In either situation, the user can access the database of identifiers 22 with a query and have returned to them one or more existing slides that are relevant to the work being carried out by the user. New relevant slides will be available to the user.

Figure 3A:
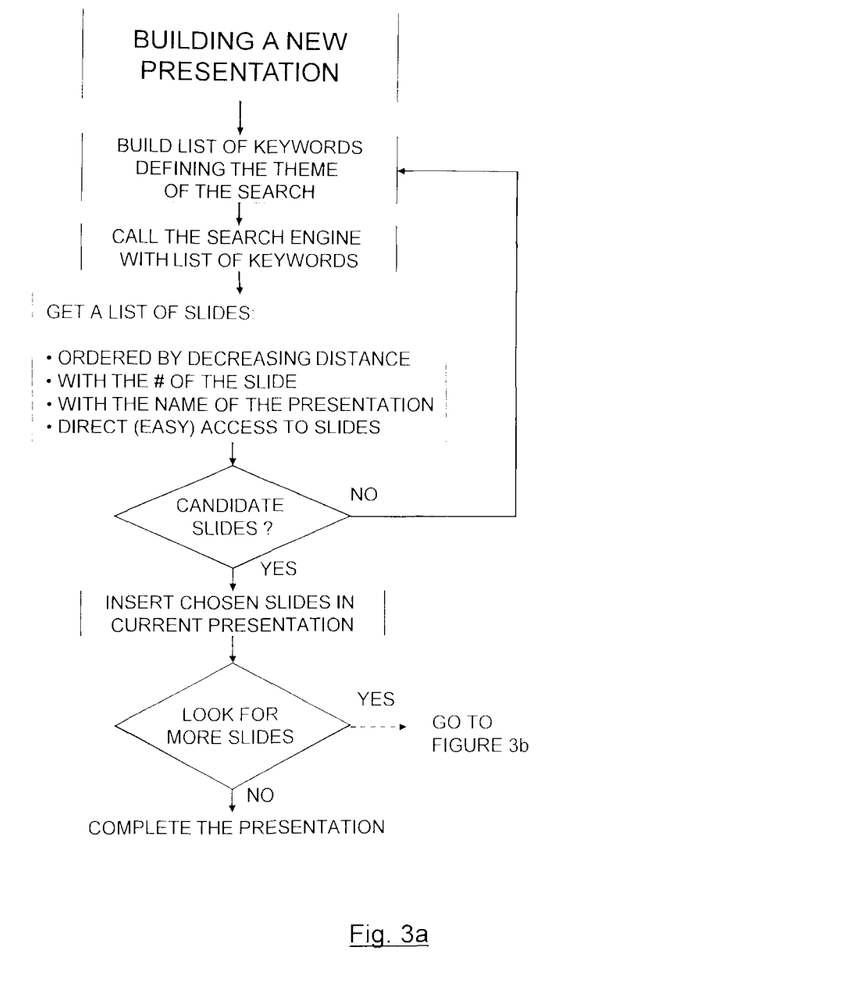
FIGS. 3a and 3b are flowcharts of methods of searching for slides.
Figure 3B:
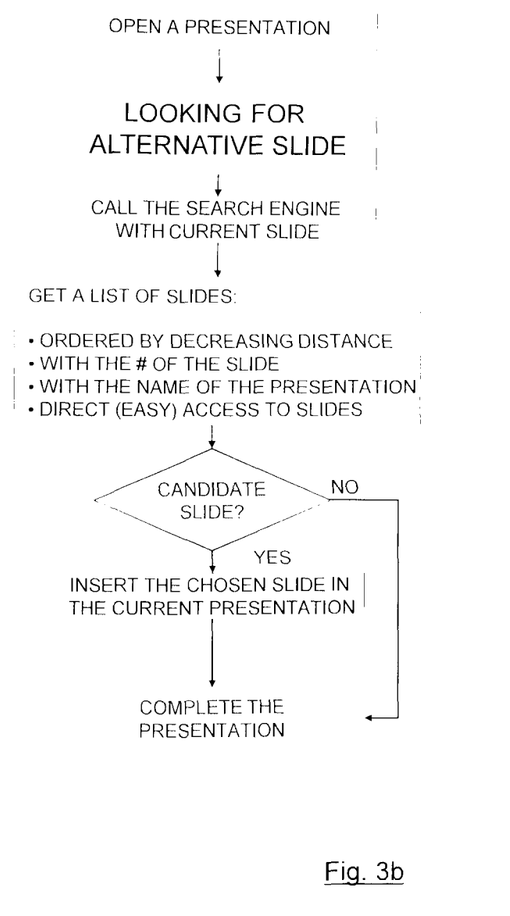

FIGS. 3a and 3b illustrate the two cases where a user may call a search interface to the database of identifiers 22. FIG. 3a is a flowchart that represents the actions that a user would take in relation to the creation of a completely new presentation from scratch. FIG. 3b is a flowchart that represents the actions that a user would take if one or more slides are already in existence in the presentation being created.

In both cases, the user defines a query that is provided to the search interface and the search interface responds by providing an ordered list of slides. The query that the user provides can either be a list of keywords (FIG. 3a when the user is starting from scratch) or a specific slide (FIG. 3b when the user already has one or more slides created). The search interface can work with either input and the output in both cases will be of the same format, i.e. a list of existing slides that are determined to be semantically close to the input provided. The exact search mechanism is described in more detail below. Essentially, the search interface creates a new identifier, either from the keywords or from the query slide, and matches the new identifier to existing identifiers 22 in the database.

Figure 4:
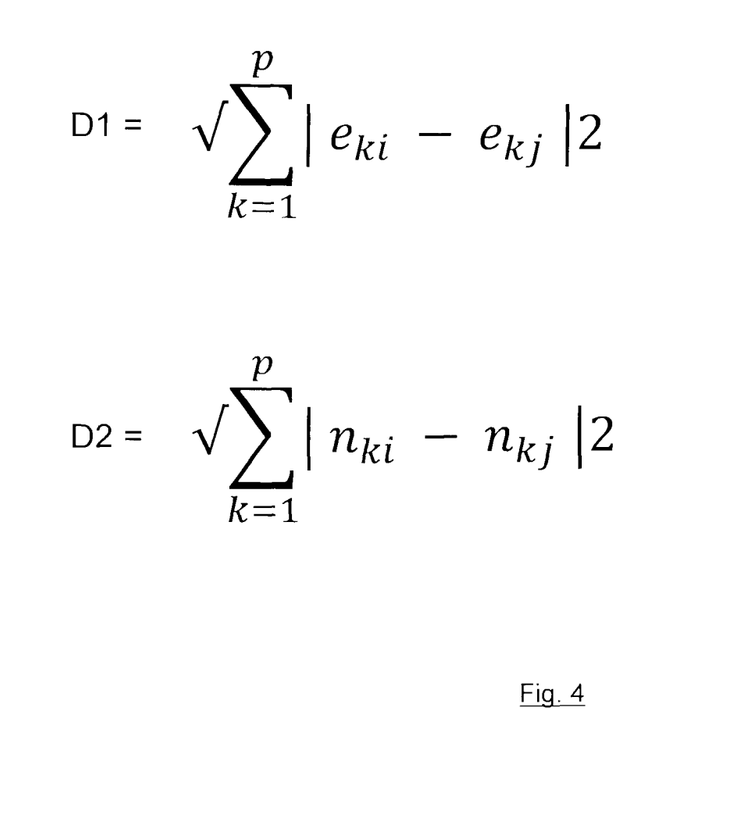
FIG. 4 is a diagram of two formulas measuring Euclidean distance.

The similarity between a query and a stored identifier 22 can be considered as a Euclidean distance. It is possible to use a Euclidian distance I) between two identifiers 22 representing two slides Si and Sj. The smaller the value of D the closer the two slides will be (if they are identical, the distance D will be 0). Different types of Euclidian distance can be used. FIG. 4 shows two different methods of calculating a Euclidean distance. In the FIG. 4, D1 is a Euclidian distance only using the existence of the words (and not using the number of instances) and D2 is a Euclidian distance using both the existence and number of instances of words.

In D1, eki=1 if wk exists in Ii and eki=0 if not and ekj=1 if wk exists in Ij and ekj=0 if not. In D2, nki=Nir if wk exists in Ii (that is r exists and Wir=wk) and nki=0 if not and nkj=Njs if wk exists in Ij (that is s exists and Wjs=wk) and nkj=0 if not. The distance D1 is a distance linked to the meaning of the slide (D1=0 if the same list of words is used). The distance D2 is a distance linked to the mode of presentation (D2=0 if the same list of words is used with the same number of instances for each word).

If Si and Sj are composed of respectively m and n different words, the two identifiers are:

$$Ii=((Wi1,Ni1), (Wi2,Ni2), (Wi3,Ni3), (Wi4,Ni4), \ldots (Wim,Nim))$$

$$IJ=((Wj1,Nj1), (Wj2,Nj2), (Wj3,Nj3), (Wj4,Nj4), \ldots (Wjn,Njn))$$

For building the distance, it is necessary to build a set of words SW that is composed of the union of all the words of Ii and Ij. This set of words will be composed of p words where (p>=max(m,n) and p<=m+n) and SW=(w1, w2,w3, w4 . . . wp).

Figure 5A:
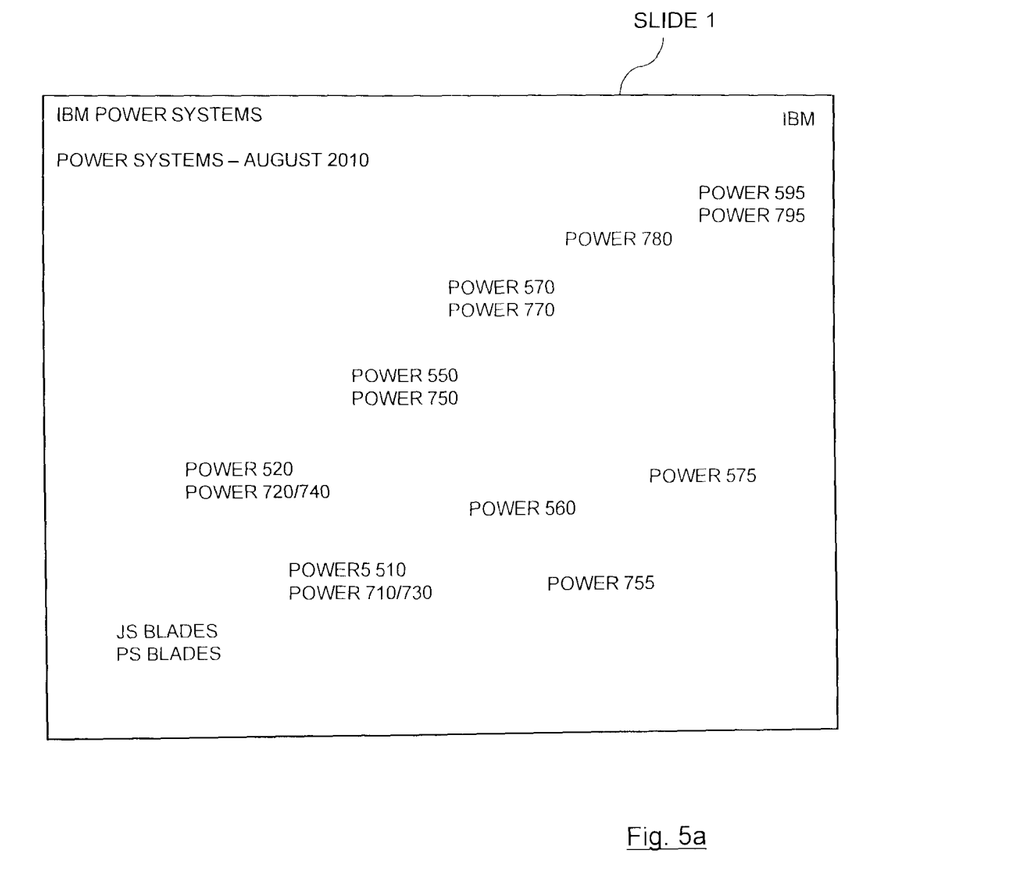
FIGS. 5a, 5b and 5c are presentation slides.
Figure 5B:
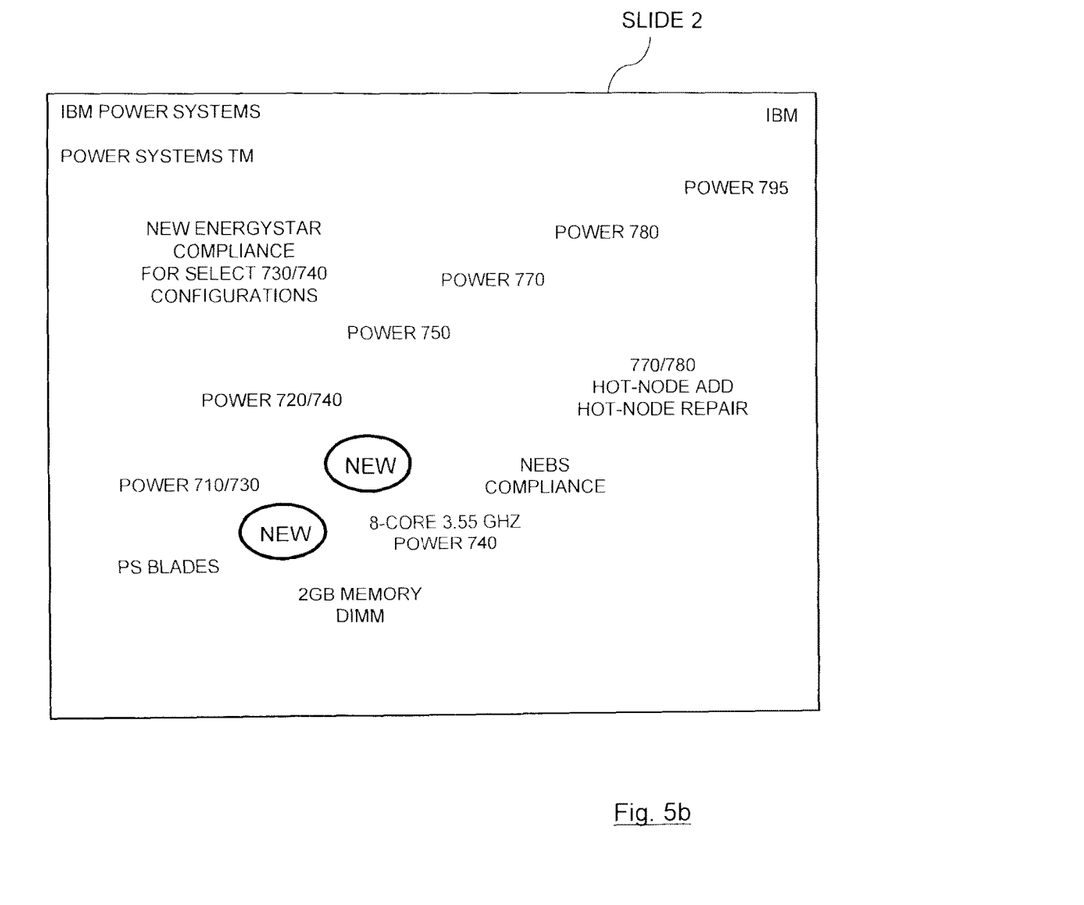
Figure 5C:
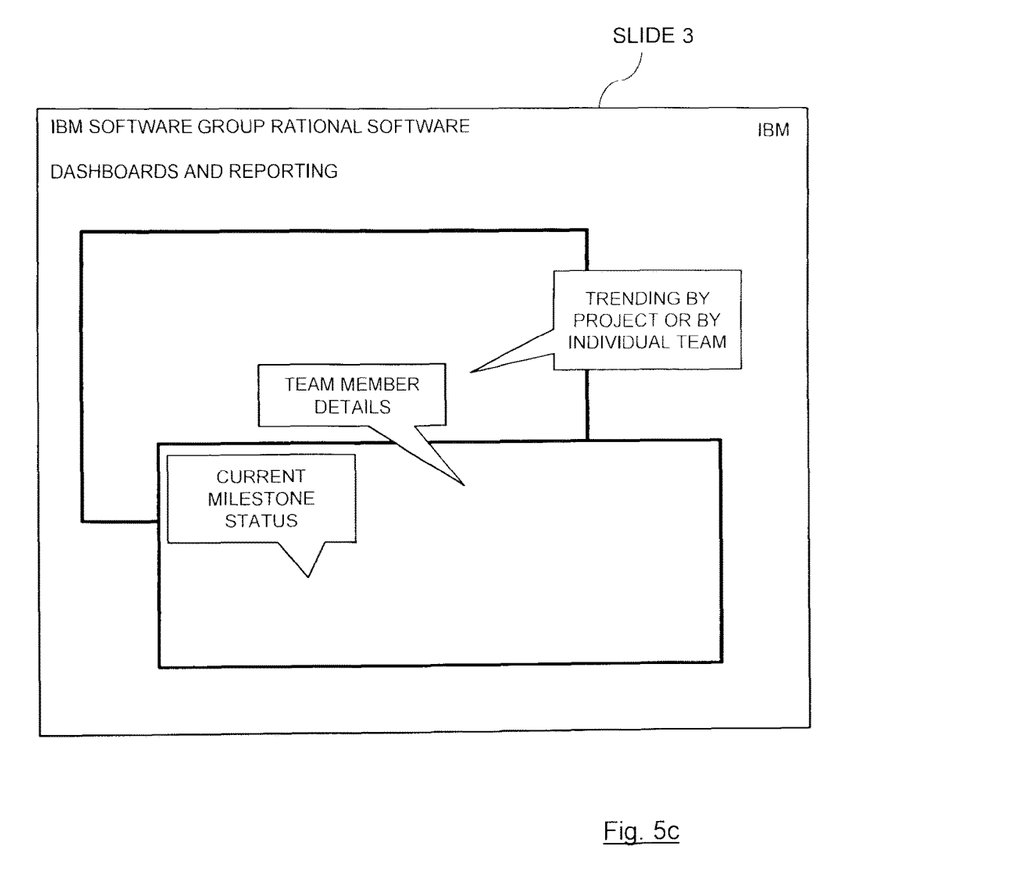

FIGS. 5a, 5b and 5c show examples of three different slides 20, where the first slide, slide 1, is the "query slide". The identifiers 22 for these three slides 20 are as follows, based on the concept that the identifier 22 is formed of a set of pairs, where each pair comprises a word (an alphanumeric string) and a count for the number of occurrences of the word:

Slide 1 identifier=[(510,1), (520,1), (550,1), (560,1), (570,1), (575,1), (595,1), (710,1), (720,1), (730,1), (740,1), (750,), (755,1), (770,1), (780,1), (795,1), (2010,1), (August, 1), (Blades,2), (JS,1), (113M,2), (Power,15), (Power5,1), (PS,1), (Systems,2)].

Slide 2 identifier=[(2GB,1), (3.55,1), (8,1), (710,1), (720, 1), (730,2), (740,3), (750,1), (770,2), (780,2), (795,1), (Add, 1), (Blades,1), (Compliance,2), (configurations,1), (Core,1), (DIMM,1), (EnergyStar,1), (for,1), (GHz,1), (Hot,2), (IBM, 2), (Memory,1), (NEBS,1), (New,1), (Node,2), (Power,9), (PS,1), (Repair,1), (Select,1), (Systems,2), (TM,1)].

Slide 3 identifier=[(and,1), (by,2), (Current,1), (Dashboard,1), (details,1), (Group,1), (IBM,2), (individual,1), (member,1), (milestone,1), (or,1), (project,1), (Rational,1), (Reporting,1), (Software,2), (status,1), (Team,2), (Trending, 1)].

Note that some words are not listed since they are part of the artwork rather than discoverable strings within the slide that can he found. For example, "New" in slide 2 does not form part of the text of the slide. Slide 1 is the reference. Slides 2 and 3 are proposed by the search engine. The distance D1 is 5.5677 between slide 1 and slide 2, and 6.4031 between slide 1 and slice 3. The distance D2 is 9.1651 between slide 1 and slide 2, and 16.7332 between slide 1 and slide 3. It can be seen that using either of the Euclidean distance measurements returns the same result, which is that slide 2 is more similar to slide 1 than slide 3 is to slide 1, since the lower the Euclidean distance measurement, the more similar two slides. It should be understood that this is a simple example, in order to illustrate the concept of matching slides 20 using the similarity of the respective identifiers 22. In reality, thousands of slides 20 will be compared to the "query slide" in order to find the closest matching slide 20.

Figure 6:
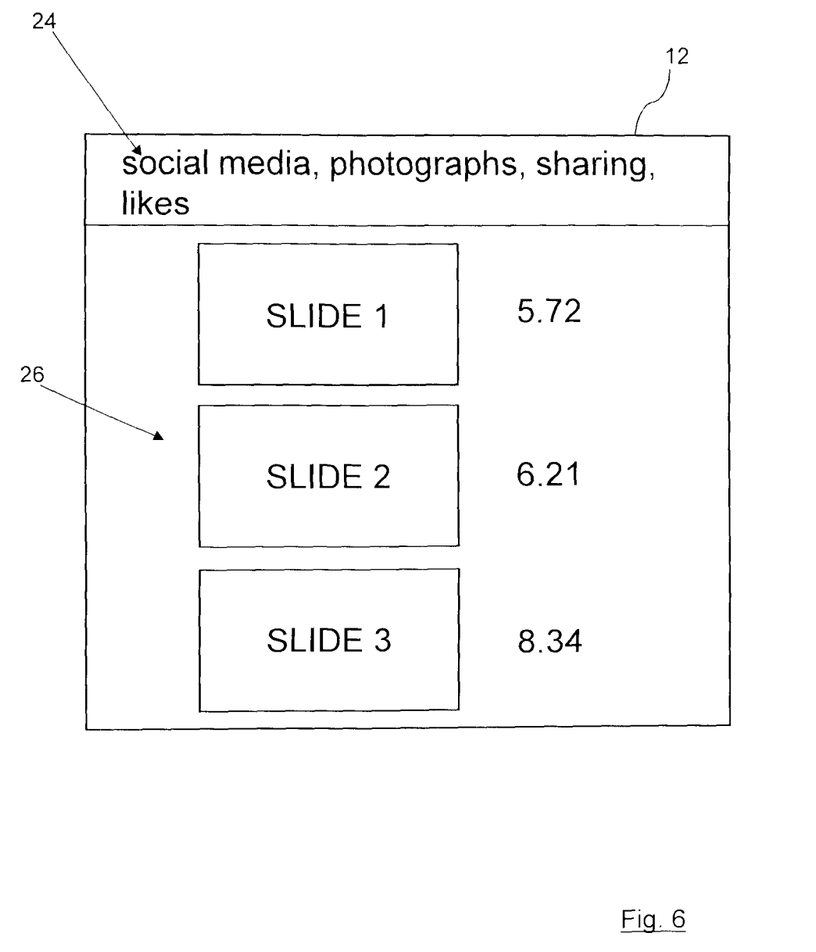
FIG. 6 is a screenshot of an ordered list of results of a search request.

FIG. 6 shows a screenshot of the display device 12 of FIG. 1 after a user has inputted a query 24 to the search interface of the database of identifiers 22, which is being handled by the processor 14. The query 24 in this example comprises the set of keywords "social media, photographs, sharing, likes", which the search interface essentially converts into an identifier with each word of the search string 24 assigned a count value of 1. A user has made this search who is about to create a presentation around these topics and wishes to see what existing slides have already been created in other presentations that relate to these topics.

The result that has been returned by the search interface comprises an ordered list of 26 slides, with a value attached that represents the Euclidean distance of the identifier derived from the search string 24 from the respective identifiers 22 of the search results. A thumbnail preview of the specific slides in the ordered list 26 is also provided to assist the user. The user can now open any of these slides to view the content in more detail, in order to ascertain the usefulness of the specific slides that have been returned by the search. The ordered list 26 is ordered so that the most relevant result is at the top.

The user is able to refine the search at any time. They could change the keywords in the search string 24 by addition and/or deletion of keywords. The user can also select a slide that they think is relevant, as a starting point for their new presentation and rerun the search with the chosen slide as the "query slide" to find further slides that are related to the one chosen as the most relevant. The query slide could be amended by the user before it is resubmitted to the search interface and in this way the results that the user receives are more likely to be relevant slides to the current presentation being created.

What is claimed is:

1. A computer controlled method of indexing presentation files in a database comprising a plurality of presentation files stored on a computer-readable medium, each of the presentation files comprising a plurality of slides forming a presentation, each of the slides comprising words, the method comprising:
  selecting a slide in the presentation file;
  selecting at least one word present in the selected slide;
  counting a number of times the at least one word occurs in the selected slide;
  storing an identifier for the selected slide in a database of identifiers, the stored identifier having a link to the slide in the presentation file, the stored identifier comprising the at least one word and the number of times the at least one word occurs in the selected slide; and generating a query slide on which a search of the presentation files in the database is to be based, comprising:
  selecting at least one word present in the query slide;
  counting a number of times at least one word occurs in the query slide;
  creating an identifier for the query slide, the identifier comprising at least one word and the number of times at least one word occurs in the query slide;
  searching the database of identifiers for a slide having a stored identifier close to the identifier for the query slide; and
  returning at least one slide having a stored identifier close to the identifier for the query slide from the presentation file stored in the database of presentation files.

2. The method of claim 1 wherein the stored identifier comprises a plurality of words and the number of times each of the plurality of words occurs in the selected slide.

3. The method of claim 1, further comprising a step of searching the database of identifiers for a list of slides in the presentation files in the database of presentation files having identifiers close to the identifier of the query slide, listed in order based upon closeness to the identifier of the query slide.

4. A computer controlled system for indexing presentation files in a database comprising a plurality of presentation files stored on a computer-readable medium, each of the presentation files comprising a plurality of slides forming a presentation, each of the slides comprising words, the system comprising: a processor; a computer memory holding computer program instructions that when executed by the processor perform the method comprising:
  selecting a slide in the presentation file;
  selecting at least one word present in the selected slide;
  counting a number of times the at least one word occurs in the selected slide;
  storing an identifier for the selected slide in a database of identifiers, the stored identifier having a link to the slide in the presentation file, the stored identifier comprising the at least one word and the number of times the at least one word occurs in the selected slide; and
  generating a query slide on which a search of the presentation files in the database is to be based, comprising:
    selecting at least one word present in the query slide;
    counting a number of times at least one word occurs in the query slide;
    creating an identifier for the query slide, the identifier comprising at least one word and the number of times at least one word occurs in the query slide;
    searching the database of identifiers for a slide having a stored identifier close to the identifier for the query slide; and
    returning at least one slide having a stored identifier close to the identifier for the query slide from the presentation file stored in the database of presentation files.

5. The system of claim 4 wherein the stored identifier comprises a plurality of words and the number of times each of the plurality of words occurs in the selected slide.

6. The system of claim 4, further comprising a step of searching the database of identifiers for a list of slides in the presentation files in the database of presentation files having identifiers close to the identifier of the query slide, listed in order based upon closeness to the identifier of the query slide.

7. A computer usable storage medium having stored thereon a computer readable program for indexing presentation files in a database comprising a plurality of presentation files stored on the computer usable storage medium, each of the presentation files comprising a plurality of slides forming a presentation, each of the slides comprising words, wherein the computer readable program when executed on a computer comprising:
  selecting a slide in the presentation file;
  selecting at least one word present in the selected slide;
  counting a number of times the at least one word occurs in the selected slide;
  storing an identifier for the selected slide in a database of identifiers, the stored identifier having a link to the slide in the presentation file, the stored identifier comprising the at least one word and the number of times the at least one word occurs in the selected slide; and
  generating a query slide on which a search of the presentation files in the database is to be based, the computer program product comprising:
    selecting at least one word present in the query slide;
    counting a number of times at least one word occurs in the query slide;
    creating an identifier for the query slide, the identifier comprising the at least one word and the number of times the at least one word occurs in the query slide;
    searching the database of identifiers for a slide having a stored identifier close to the identifier for the query slide; and
    returning at least one slide having a stored identifier close to the identifier for the query slide from the presentation file stored in the database of presentation files.

8. The computer usable storage medium of claim 7 wherein the stored identifier comprises a plurality of words and the number of times each of the plurality of words occurs in the selected slide.

9. The computer usable storage medium of claim 7, further comprising searching the database of identifiers for a list of slides in the presentation files in the database of presentation files having identifiers close to the identifier of query slide, listed in order based upon closeness to the identifier of the query slide.

* * * * *